Oct. 15, 1946.　　　P. SCHLUMBOHM　　　2,409,226
DEVICE FOR VACUUM FILTRATION
Filed April 24, 1943

INVENTOR.

Patented Oct. 15, 1946

2,409,226

UNITED STATES PATENT OFFICE 2,409,226

DEVICE FOR VACUUM FILTRATION

Peter Schlumbohm, New York, N. Y.

Application April 24, 1943, Serial No. 485,264

7 Claims. (Cl. 210—162)

The present invention refers to a filtering method and a filtering device, and more specifically to a filtering device in which vacuum is applied to force the liquid through a filter.

The invention simplifies the creation of a vacuum. In view of the application of vacuum filtering devices for making coffee, the invention made will be applied also to this specific task. Inasmuch as such vacuum coffee makers were so far the simplest type of a vacuum filtering device I may best refer to them, to show the difference between them and the present invention.

Figure 1:
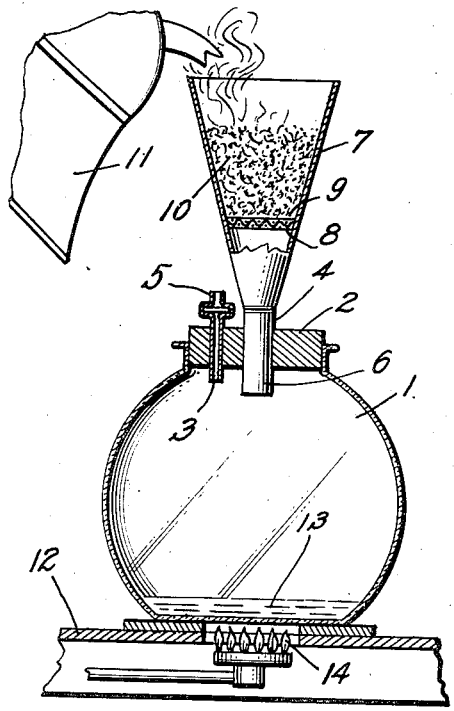
Figure 2:
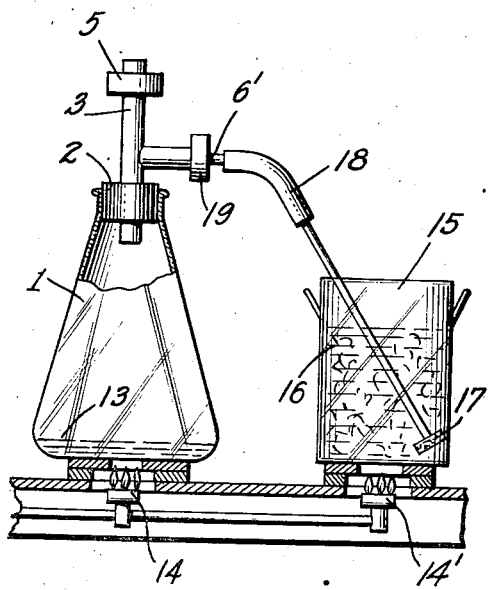
Figure 3:
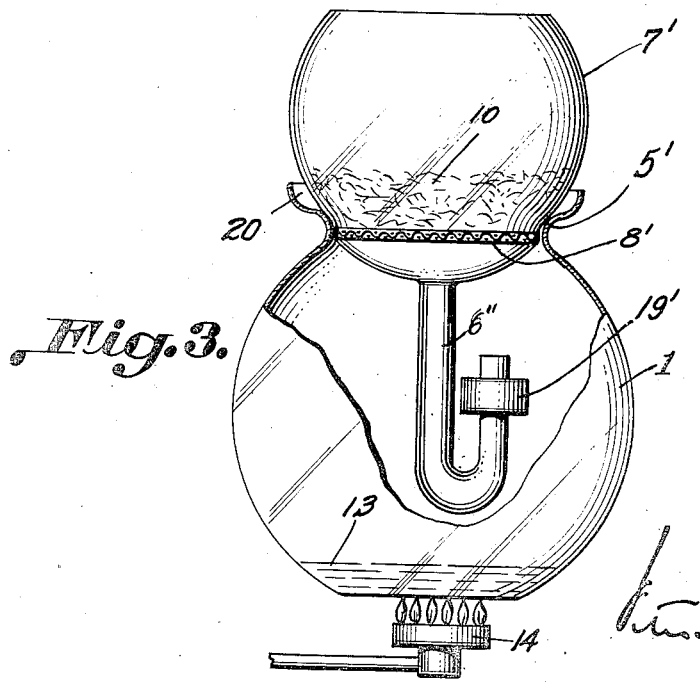

My invention is illustrated by way of examples partly in view and partly in sections, in Figure 1, Figure 2, and Figure 3, of the accompanying drawing.

In Figure 1, a filtrate flask, 1, is equipped with the stopper, 2, which has two bores. One bore holds a tube, 3, with a check valve, 5; the other bore, 4, takes the stem, 6, of a filter funnel, 7. In the example shown in Figure 1, this filter funnel is equipped with a filter plate, 8, which may be of ceramics, and which may be supplemented by a filter paper, 9. The filter funnel, 7, is partly filled with coffee grounds, 10. A water kettle, 11, is shown to indicate that boiling water may be poured on the coffee grounds. The filtrate flask, 1, stands on a heating device, for instance, a gas range, 12.

In operating this filtering device I proceed as follows: A small quantity of water, 13, is filled into the filtrate flask, 1, the coffee grounds, 10, are put in their place, and the flame, 14, is ignited. Part of the water, 13, will be transformed into steam and this steam will expel the air of the filtrate flask, 1. The air will leave by the way of least resistance through the check valve, 5.

While this goes on, I steep the coffee grounds, 10, by soaking them with a small quantity of boiling water. This is done for reasons of its own, to open up the coffee grounds. But in the present set-up this also closes the way through tube 6 to the air and steam which thus leave the filtrate flask exclusively through tube 3.

After the air has been expelled I add more water to the coffee grounds, 10, and I extinguish the flame, 14. This will result now in the formation of a vacuum in the filtrate flask, 1, as the check valve 5 prevents the outside air from entering through tube 3. It means that the atmospheric pressure now forces the liquid above the filter, 8, 9, through the filter, with all the characteristics of a vacuum filtration. Of course, one has to follow up with adding new boiling water from the kettle, 11, to maintain the liquid seal above the filter, 8, 9, until the desired quantity of filtrate, in this case coffee, appears in the filtrate flask, 1; after that, air may penetrate through the filter, 8, 9, and break the vacuum.

The example in Figure 2 varies from the example in Figure 1, mainly by providing two separate containers, one for the filtrate, as before, and one for the total amount of the unfiltered liquid. Furthermore, Figure 2 shows that the stopper, 2, can be built with one bore only, and that the check valve, 5, with its tube, 3, may branch off from the channel, 6¹, carrying later on the filtrate. The container, 15, may be an old-fashioned coffee pot, which stands on a range over a flame, 14¹. Coffee would be made in this pot, 15, by bringing the water, 16, to a boil, adding the coffee grounds and extinguishing the flame, 14¹. In the example shown, I use a dip filter, 17, connected by a tube, 18, to the tube 6¹, inserted in the stopper, 2, of the filtrate flask, 1. The procedure in this case would be: After extinguishing the flame, 14¹, and allowing a few minutes for brewing, the dip filter, 17, is hung into the coffee pot, 15, and the flame, 14, is ignited, to expel the air from the filtrate flask, 1, by producing steam from water, 13. I may provide in this set-up an additional check valve, 19, which prevents the steam to enter into tube 6. This check valve would be so designed as to allow subsequently the free flow of the liquid from tube 6 into the filtrate flask, 1. However, the device is operative without this check valve, 19. In the example, as shown in Figure 3, such a check valve, 19¹ to prevent flow of steam from the filtrate flask, 1, through tube 6″, towards the filter, 8¹, however, is a necessity. The reason is that in this case the channel for the air escape offers resistance. This channel is formed in this example by a valve-like joint, 5¹, between the neck of the filtrate flask and the bottom of the filter funnel, 7¹. Steam evolved from water, 13, must overcome the weight of the filter funnel, 7¹, which functions in this case like a safety valve. Of course, the joint 5¹ must be well ground to provide an air-tight seal during the condensation phase. I found it advantageous to provide an annular cup, 20, above the joint proper. Steam condensed at the outer wall of 7¹, during the air expelling phase, will supply seal-water for this cup, 20, and such water will keep the surfaces of the joint, 5¹, wet, increasing their sealing capacity.

Comparing a coffee maker, as made by this invention, with the usual vacuum coffee maker, the principal difference seems to be that in the old vacuum coffee maker steam is produced to displace water from the filtrate flask and to displace it through the same tube through which it returns later on as filtrate. In the present invention, steam is produced to displace the air from the filtrate flask. Furthermore, the air is displaced through a channel which is not identical with the channel through which the filtrate flows from the filter to the filtrate flask. This invention has the advantage that the filter may be designed purely to meet the requirements of the filtering purposes, whereas, in the old devices, the filter also had to meet the requirements of allowing passage of the water displaced from the filtrate flask under very little pressure. The practical consequence is that, in the present invention, the filter may be much finer and smaller. For instance, the present invention could operate with the well known glass filters made from sintered glass, 8, 17, 8'.

Having now described the nature of my invention and described, by way of examples, the manner in which it may be performed, I claim as my invention:

1. A vacuum filtering device comprising a flask for filtrate, a filtering element, communicating means leading from said filtering element to said filtrate flask, means for communicating said filtrate flask directly to the atmosphere, and means responsive to the pressure within said filtrate flask for closing said second communicating means.

2. The structure recited in claim 1 and means associated with said first communicating means to prevent flow from said filtrate flask to said filtering element.

3. The structure recited in claim 1, said last mentioned means comprising a valve construction wherein the valve seat is formed by the mouth of the filtrate flask and the valve is formed by the bottom of the filtering element.

4. The structure recited in claim 1, said last mentioned means comprising a valve construction wherein the valve seat is formed by the mouth of the filtrate flask and the valve is formed by the bottom of the filtering element, said filtering element comprising a walled receptacle for unfiltered liquid and a filter, said walled receptacle being adapted to contain unfiltered liquid whereby the valve will be weighted.

5. A vacuum filtering device comprising a flask for filtrate, a filtering element, communicating means leading from said filtering element to said filtrate flask, means for preventing the flow of liquid from said filtrate flask through said communicating means to said filtering element, means for communicating said filtrate flask directly to the atmosphere and means responsive to the pressure within said filtrate flask for closing said second communicating means, said last mentioned means incorporating a valve construction wherein the valve seat is formed by the mouth of the filtrate flask and the valve is formed by the bottom of the filtering element.

6. A vacuum filtering device comprising a flask for filtering, a filtering element, communicating means leading from said filtering element to said filtrate flask, means for preventing the flow of liquid from said filtrate flask through said communicating means to said filtering element, means for communicating said filtrate flask directly to the atmosphere and means responsive to the pressure within said filtrate flask for closing said second communicating means, said last mentioned means incorporating a valve construction wherein the valve seat is formed by the mouth of the filtrate flask, the valve is formed by the bottom of the filtering element, and the valve is adapted to be moved to open position under the influence of vapor pressure within said filtrate flask and closed under the influence of gravity acting upon the weight or mass of the filtering element.

7. A vacuum filtering device comprising a flask for filtrate, a filtering element, communicating means leading from said filtering element to said filtrate flask, means for preventing the flow of fluid from said filtrate flask through said communicating means to said filtering element, means for communicating said filtrate flask directly to the atmosphere, and means responsive to the pressure within said filtrate flask for closing said second communicating means.

PETER SCHLUMBOHM.